United States Patent
Toy et al.

(10) Patent No.: US 11,841,058 B2
(45) Date of Patent: Dec. 12, 2023

(54) METHODS AND APPARATUS TO DETERMINE BRAKE PAD WEAR

(71) Applicant: Ford Global Technologies, LLC, Dearborn, MI (US)

(72) Inventors: Andrew Edward Toy, Northville, MI (US); Jeremy Lerner, Southfield, MI (US); Taylor Hawley, Oak Park, MI (US); Mohammad Abouali, Canton, MI (US); Ali Abdallah, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/576,483

(22) Filed: Jan. 14, 2022

(65) Prior Publication Data

US 2023/0228310 A1 Jul. 20, 2023

(51) Int. Cl.
*F16D 66/02* (2006.01)
*F16D 66/00* (2006.01)

(52) U.S. Cl.
CPC ...... *F16D 66/026* (2013.01); *F16D 2066/006* (2013.01)

(58) Field of Classification Search
CPC ...... F16D 66/02; F16D 66/021; F16D 66/026; F16D 66/027; F16D 66/028; F16D 2066/006
See application file for complete search history.

(56) References Cited

U.S. PATENT DOCUMENTS

| | | | |
|---|---|---|---|
| 6,655,502 B2 * | 12/2003 | Sokoll | B60T 17/22 188/1.11 W |
| 10,539,200 B2 | 1/2020 | Patel et al. | |
| 10,870,422 B2 | 12/2020 | Jo et al. | |
| 10,962,071 B2 | 3/2021 | Chung | |
| 2005/0082122 A1 * | 4/2005 | Taylor | F16D 65/18 188/1.11 L |
| 2019/0093722 A1 * | 3/2019 | Patel | B60T 8/885 |
| 2020/0339093 A1 | 10/2020 | Takahashi et al. | |

FOREIGN PATENT DOCUMENTS

| | | | |
|---|---|---|---|
| DE | 3407716 C2 * | 1/1993 | F16D 25/126 |
| DE | 102019218004 A1 * | 5/2020 | B60T 13/74 |
| EP | 2520817 B1 | 9/2020 | |

* cited by examiner

*Primary Examiner* — Thomas J Williams
(74) *Attorney, Agent, or Firm* — Lorne Forsythe; Hanley, Flight & Zimmerman LLC

(57) ABSTRACT

Methods, apparatus, systems, and articles of manufacture to extend brake life cycle are disclosed herein. An example vehicle disclosed herein includes a brake including a rotor and a brake pad and a brake controller to detect a request to determine a wear level of the brake pad, activate the brake to cause contact between the brake pad and the rotor, and determine, based on a latency between the activation of the brake and the contact between the brake pad and the rotor, the wear level.

17 Claims, 9 Drawing Sheets

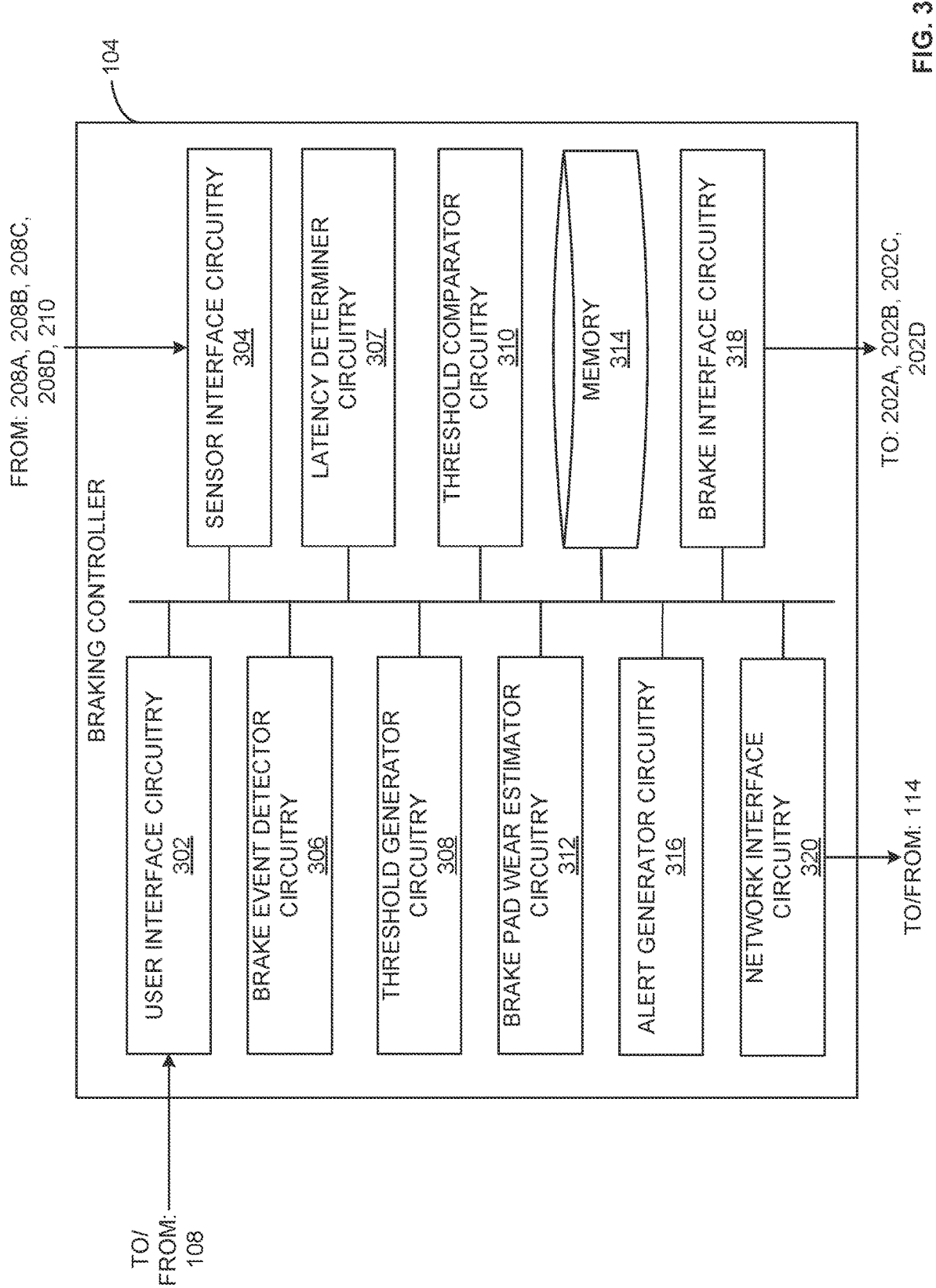

METHODS AND APPARATUS TO DETERMINE BRAKE PAD WEAR

FIELD OF THE DISCLOSURE

This disclosure relates generally to vehicles and, more particularly, to methods and apparatus to determine brake pad wear.

BACKGROUND

Many vehicles include a brake-by-wire system. Unlike hydraulic brakes, the electric brakes of brake-by-wire systems retard the rotation of wheels of vehicles via electric actuators. Some electric brake systems (EBS) are configured such that, when the driver activates the brakes (e.g., via a brake pedal, etc.), an electrical command is sent to the actuators of the brakes, thereby causing a braking force to be applied to the wheels.

SUMMARY

An example vehicle disclosed herein includes a brake including a rotor, and a brake pad, and a brake controller to detect a request to determine a wear level of the brake pad, activate the brake to cause contact between the brake pad and the rotor, and determine, based on a latency between the activation of the brake and the contact between the brake pad and the rotor, the wear level.

An example method disclosed herein includes detecting a request to determine a wear level of a brake pad of a brake of a vehicle, activating the brake to cause contact between the brake pad and a rotor of the brake, and determining, based on a latency between the activation of the brake and the contact between the brake pad and the rotor, the wear level.

An example non-transitory computer readable medium disclosed herein comprising instructions, which, when executed cause a processor to detect a request to determine a wear level of a brake pad of a brake of a vehicle, activate the brake to cause contact between the brake pad and a rotor of the brake, and determine, based on a latency between the activation of the brake and the contact between the brake pad and the rotor, the wear level.

BRIEF DESCRIPTION OF THE DRAWINGS

FIG. 3 is a block diagram of the brake controller of FIGS. 1 and 2.

Figure 1:
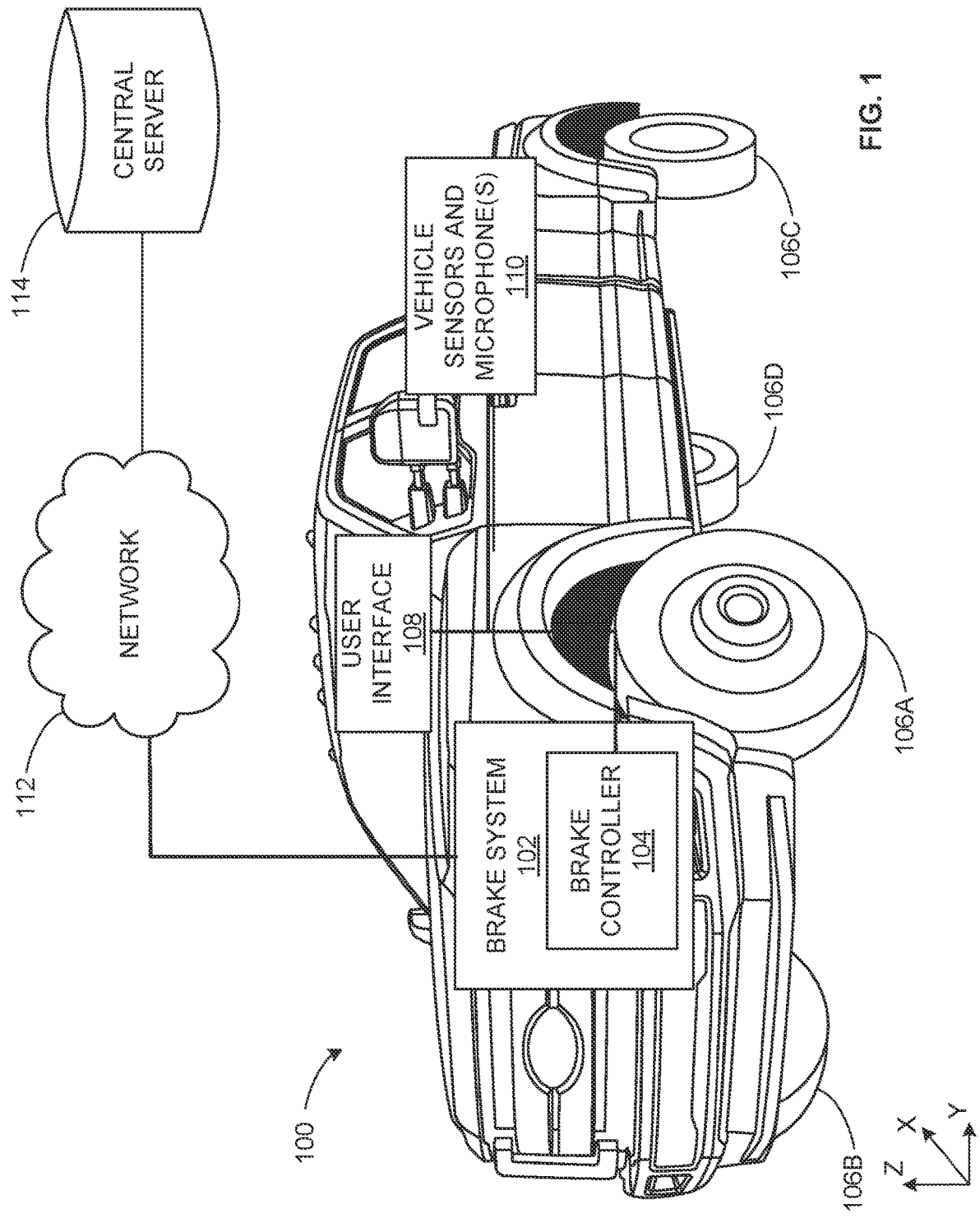
FIG. 1 is a perspective view of a vehicle in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, the orientation of features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. The terms "below" and "above" are used to refer to directions along the vertical axis closer to the ground and away from the ground, respectively. As used herein, the lateral axis of the vehicle is perpendicular to the longitudinal and vertical axes and is generally parallel to the axles of the vehicle. As used herein, the terms "longitudinal," and "axial" are used interchangeably to refer to directions parallel to the longitudinal axis. As used herein, the terms "lateral" and "horizontal" are used to refer to directions parallel to the lateral axis. As used herein, the term "vertical" is used interchangeably to refer to directions parallel to the vertical axis.

Vehicle brakes often include brake pads disposed on a caliper of the brake. In some examples, brake pads are composed of a rigid backplate and a friction pad coupled thereto. In some such examples, when the brakes are engaged, the caliper is actuated towards the rotor, causing the brake pad to contact the rotor. The friction between the brake pad and the rotor converts the kinetic energy of the rotating rotor into thermal energy, thereby slowing the rotation of the vehicle. Over the service life of a brake pad, the friction pad is gradually worn due to the contact with the rotor, reducing the effectiveness of the brakes (e.g., brake fade, etc.) and potentially causing damage to the rotor and/or caliper caused by contact between backplate and the rotor. Accordingly, users frequently change their brake pads to prevent damage to their brakes and to prevent brake fade. Because the amount of brake pad wear varies based on the usage of the vehicle (e.g., how frequently the vehicle slows, how forcefully the brakes are applied during a braking event, etc.) and the load on the vehicle (e.g., heavier vehicle loads causes greater brake pad wear, etc.), it can be difficult to estimate the wear of brake pads without visual inspection.

Examples disclosed herein enable the wear level of brake pads to be determined without visual inspection. In some examples disclosed herein, the electric current supplied by the motor(s) of an electric brake system can be used to determine the wear level of a brake pad. In some such examples disclosed herein, the latency between the activation of the electric brake and the contact between the brake pad and the rotor can be used to estimate the brake pad wear level. In some such examples, the determined latency can be compared to one or more thresholds to determine the remaining service life of the brake pad and/or if an alert should be generated to indicate to the user that the brake pad should be replaced. In some such examples disclosed herein, the thresholds can be determined based on historic brake wear information associated with the vehicle associated with the brakes and/or other vehicles.

In some examples disclosed herein, the total power applied by the electric brakes can be used to determine the wear level of the brake pad. In some such examples disclosed herein, the total power applied by the electric brakes can be compared to one or more thresholds to determine the remaining service life of the brake pad and/or if an alert should be generated to indicate to the user that the brake pad should be replaced. In some examples disclosed herein, a microphone associated with the vehicle can measure the noise associated with the application of the brakes. In some examples, the noise level (e.g., brake noise, brake squeal, etc.) can be compared to a threshold to determine if the backplate of the brake pad is in contact with the rotor, thereby indicating the brake pads are significantly worn.

FIG. 1 is a perspective view of a vehicle 100 in which examples disclosed herein can be implemented. In the illustrated example of FIG. 1, the vehicle 100 includes an example brake system 102, an example brake controller 104, an example first wheel 106A, an example second wheel 106B, an example third wheel 106C, and an example fourth wheel 106D. In the illustrated example of FIG. 1, the vehicle 100 includes an example user interface 108 and example vehicle sensors and microphones 110. In the illustrated example of FIG. 1, the vehicle 100 is connected, via an example network 112, to an example central server 114.

The vehicle 100 is a motorized wheel-driven vehicle. In the illustrated example of FIG. 1, the vehicle 100 is a pick-up truck. In other examples, the vehicle 100 can be any type of vehicle with brakes (e.g., a sedan, a coupe, a van, a pick-up truck, a sports utility vehicle, an all-terrain vehicle (ATV), farming equipment, etc.). In some examples, the vehicle 100 includes an internal combustion engine (e.g., a non-electrified vehicle, a partially electrified vehicle, etc.). In other examples, the vehicle 100 can be implemented as a fully electric vehicle.

The brake system 102 includes mechanical and electrical components that retard the rotation of the wheels 106A, 106B, 106C, 106D. The brake system 102 can receive user input (e.g., via the user interface 108, etc.) and cause activation of one or more brake(s) of the brake system 102. While the brake system 102 is described herein as an electric disc brake system, the examples described herein can also be applied to any other suitable type of brake system (e.g., a drum brake system, a dual disc-drum brake system, a clasp brake system, band brake systems, electromagnetic brakes, etc.). Similarly, while the brake system 102 described herein is a brake-by-wire system, the examples described herein can also be applied to hydraulic and/or hybrid brake systems. An example implementation of the brake system 102 is described in greater detail below in FIG. 2.

The wheels 106A, 106B, 106C, 106D include a wheel rim and a corresponding tire. While in the illustrated example of FIG. 1, the vehicle 100 has two axles and four wheels, in other examples, the vehicle 100 can have any number of axles and wheels. In the illustrated example of FIG. 1, the first wheel 106A and the second wheel 106B are front wheels and the third wheel 106C and the fourth wheel 106D are rear wheels. In the illustrated example of FIG. 1, the first wheel 106A and the third wheel 106C are driver-side wheels and the second wheel 106B and the fourth wheel 106D are passenger-side wheels.

The user interface 108 enables a user of the vehicle 100 to receive and input information to the brake system 102 and other systems of the vehicle 100. For example, the user interface 108 can include a display of the vehicle 100. In some examples, the user interface 108 can include an interface to operate the brake system 102 during operation of the vehicle 100 (e.g., a brake pedal, a hand lever, etc.). In some examples, the user interface 108 can receive an instruction from a user of the vehicle 100 to brake the vehicle 100. Additionally or alternatively, the user interface 108 can include one or more dash indicator(s), one or more button(s) on the dashboard or steering wheel, one or more speakers, one or more microphones, etc. In some examples, the user interface 108 can be fully or partially implemented by a mobile device of the user (e.g., a mobile phone, a smartwatch, a tablet, etc.).

During the operation of the vehicle 100, the brake system 102 is controlled via the brake controller 104. For example, in response to a user input (e.g., the depression of a brake pedal, etc.) and/or an automated input (e.g., the vehicle 100 detecting an imminent obstacle in front of the vehicle 100, etc.), the brake controller 104 can cause the brake system 102 to retard the rotation of some or all of the wheels 106A, 106B, 106C, 106D, thereby slowing the vehicle 100. In some examples, the brake system 102 can determine the wear level of the brake pad(s) of the brake system 102 based on data collected by the vehicle sensors and microphones 110 and/or sensor(s) associated with the wheels 106A, 106B, 106C, 106D. In some examples, the brake controller 104 can, via the user interface 108, alert a user of the vehicle 100 of the remaining service of the brake pad(s) of the brake system 102 and/or if some or all of the brake pad(s) of the brake system 102 should be replaced. The brake controller 104 is described in greater detail below in FIGS. 2 and 3.

The network 112 enables communications between the vehicle 100 (e.g., the brake controller 104, etc.) and other network entities (e.g., the central server 114, other vehicles, etc.). In some examples, the network 112 can be implemented as a cellular network, the internet, a cellular network, or any other suitable wide area network (WAN). In other examples, the network 112 can be a wired connection. In some such examples, the vehicle 100 can interface with the central server 114 via a wired connection (e.g., the vehicle 100 can be connected while the vehicle 100 is being serviced, etc.). In some examples, the network 112 can be implemented via multiple networks (e.g., a local area network coupled to a wide area network, etc.).

The central server 114 is a server that stores information relating to the vehicle 100. For example, the central server 114 can include performance data relating to the vehicle 100 and other vehicles similar to the vehicle 100. In some examples, the vehicle 100 can transmit data, via the network 112, to the central server 114 relating to the wear level and mileage associated with the brake pads of the vehicle 100. Additionally or alternatively, the central server 114 can transmit information to the brake controller 104 relating to the brake pads used by other vehicles. In such examples, the brake controller 104 can determine the wear level of the brake pads partly based on the information from the central server 114. In some examples, the central server 114 is maintained by a manufacturer of the vehicle 100 and/or a manufacturer of the brake pads of the vehicle 100. Additionally or alternatively, the central server 114 can be maintained by any other suitable entity (e.g., an insurance company, a government entity, a third-party agency, etc.). In some examples, the central server 114 can be a computer associated with a vehicle technician. In such examples, the vehicle 100 can communicate with the central server 114 while the vehicle 100 is being serviced. In some examples, the network 112 and/or the central server 114 can be absent. In some such examples, the brake controller 104 determines wear information via locally generated/stored information.

Figure 2:
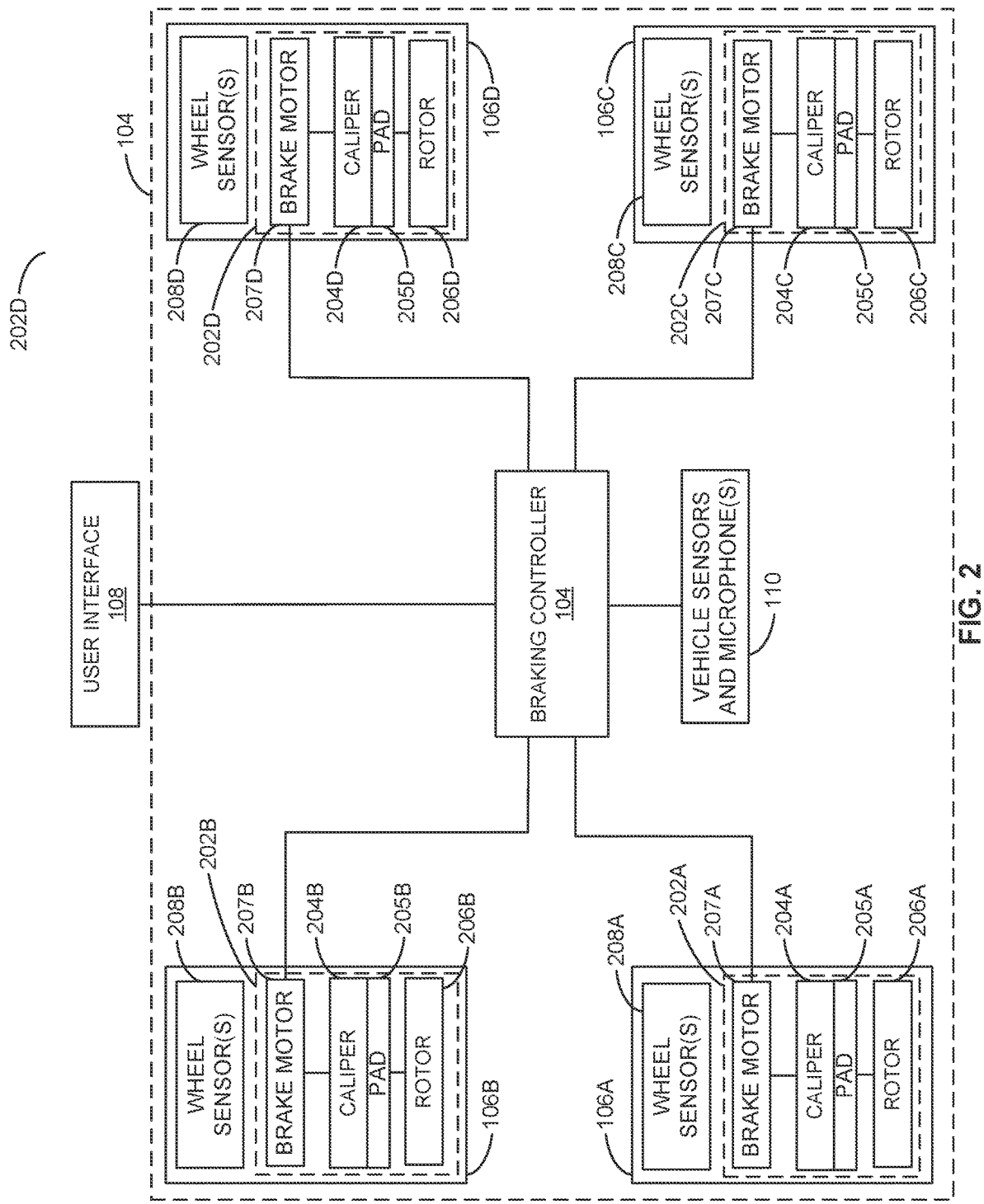
FIG. 2 is a system diagram of the brake system of FIG. 1.

FIG. 2 is a system diagram of the brake system 102 of FIG. 1. In the illustrated example of FIG. 2, the brake system 102 includes an example brake controller 104. In the illustrated example of FIG. 2, the brake system 102 includes an example first brake 202A, an example second brake 202B, an example third brake 202C, and an example fourth brake 202D, which are associated with the first wheel 106A, the second wheel 106B, the third wheel 106C, and the fourth wheel 106D, respectively. In the illustrated example of FIG. 2, the first brake 202A includes an example first caliper 204A, an example first brake pad 205A, an example first rotor 206A, and an example first brake motor 207A. In the illustrated example of FIG. 2, the second brake 202B includes an example second caliper 204B, an example second brake pad 205B, an example second rotor 206B, and an example second brake motor 207B. In the illustrated example of FIG. 2, the third brake 202C includes an example third caliper 204C, an example third brake pad 205C, an example third rotor 206C, and an example third brake motor 207C. In the illustrated example of FIG. 2, the fourth brake 202D includes an example fourth caliper 204D, an example fourth brake pad 205D, an example fourth rotor 206D, and an example fourth brake motor 207D. In the illustrated example of FIG. 2, the brake system 102 includes example first wheel sensors 208A, example second wheel sensors 208B, example third wheel sensors 208C, example fourth wheel sensors 208D, which are associated with the wheels 106A, 106B, 106C, 106D, respectively, and the example vehicle sensors and microphones 110.

The brake controller 104 controls the brakes 202A, 202B, 202C, 202D of the vehicle 100. For example, the brake controller 104 can cause the calipers 204A, 204B, 204C, 204D to engage the corresponding one of the rotors 206A, 206B, 206C, 206D during operation of the vehicle (e.g., to bring the vehicle 100 from a velocity to a stop, to hold the vehicle, etc.). In some examples, the brake controller 104 communicates with the calipers 204A, 204B, 204C, 204D via a controller area network (CAN) bus of the vehicle 100. Additionally or alternatively, the brake controller 104 can communicate with the calipers 204A, 204B, 204C, 204D via an independent communication system (e.g., an electrical communication system, a hydraulic communication system, etc.). The brake controller 104 can be implemented by an electronic control unit of the vehicle 100 (e.g., a dedicated brake control module (BCM), one or more vehicle control module(s) (VCM), one or more domain controller(s), etc.). In other examples, some or all of the components of the brake controller 104 can be implemented by one or more other system(s) of the vehicle 100 (e.g., the anti-lock brake system (ABS), the electronic stability system (ESC), a powertrain controller, a transmission controller, etc.).

The calipers 204A, 204B, 204C, 204D are mechanical components that receive inputs from the brake controller 104. After receiving an input (e.g., a braking signal, etc.) from the brake controller 104, the brake motors 207A, 207B, 207C, 207D can cause the calipers 204A, 204B, 204C, 204D to apply a clamping pressure (e.g., via one or more pistons, etc.) to a respective one of the rotors 206A, 206B, 206C, 206D, thereby slowing rotation of the corresponding one of the wheels 106A, 106B, 106C, 106D. The brake pads 205A, 205B, 205C, 205D are designed to abrade on contact with the rotors 206A, 206B, 206C, 206D thereby preventing damage, deformation, and/or warping to the rotors 206A, 206B, 206C, 206D and the calipers 204A, 204B, 204C, 204D. Over the course of the service life of the vehicle 100, the brake pads 205A, 205B, 205C, 205D must be periodically replaced after a certain amount of wear to prevent brake fade and/or damage other components of the brake system 102.

The rotors 206A, 206B, 206C, 206D are discs that are connected to the wheels 106A, 106B, 106C, 106D, respectively. The rotors 206A, 206B, 206C, 206D are rigidly connected to and rotate with the wheels 106A, 106B, 106C, 106D. During operation of the brakes 202A, 202B, 202C, 202D, the calipers 204A, 204B, 204C, 204D via the brake pads 205A, 205B, 205C, 205D apply a frictional force to the rotors 206A, 206B, 206C, 206D, thereby slowing the rotation of the corresponding one of the wheels 106A, 106B, 106C, 106D. The rotors 206A, 206B, 206C, 206D can have any suitable shape (e.g., circular, etc.) and any suitable features (e.g., slots, holes, etc.).

The wheel sensors 208A, 208B, 208C, 208D are sensors associated with the respective ones of the wheels 106A, 106B, 106C, 106D to measure characteristics associated with the wheels 106A, 106B, 106C, 106D, and the brakes 202A, 202B, 202C, 202D. For example, the wheel sensors 208A, 208B, 208C, 208D can include sensors disposed on the corresponding ones of the brake motors 207A, 207B, 207C, 207D, which measures the current and/or power associated with the brake motors 207A, 207B, 207C, 207D. In some examples, the wheel sensors 208A, 208B, 208C, 208D include sensors that measure the weight of the brake pads 205A, 205B, 205C, 205D. In some examples, the wheel sensors 208A, 208B, 208C, 208D include microphones that measure the noise generated by the brakes 202A, 202B, 202C, 202D. In such examples, the microphone(s) can be disposed adjacent to corresponding ones of the brakes 202A, 202B, 202C, 202D. Additionally or alternatively, the wheel sensors 208A, 208B, 208C, 208D can include any other suitable sensors.

The vehicle sensors and microphones 110 measure the properties of the vehicle 100. In the illustrated example of FIG. 2, the vehicle sensors 110 includes an odometer to measure the miles traveled by the vehicle 100. In some examples, the vehicle sensors and microphones 110 can measure the amount of time each of the brakes 202A, 202B, 202C, 202D was engaged. In some examples, the vehicle sensors and microphones 110 can measure the properties (e.g., the frequency, the occurrence rate, the loudness, etc.) of the noise associated brakes 202A, 202B, 202C, 202D. In other examples, the vehicle sensors and microphones 110 can include any suitable sensors. In some examples, the vehicle sensors and microphones 110 can be part of another system of the vehicle 100.

During normal service of the vehicle 100, the operation of the brakes 202A, 202B, 202C, 202D is controlled via the user interface 108 and the brake controller 104. For example, the brake controller 104 can receive user inputs (e.g., depression of a brake pedal, etc.). In some examples, the brake controller 104 causes engagement of the first brake 202A by communicating (e.g., via a wired connection, via a wireless connection, etc.) with the first brake motor 207A that drivers the first caliper 204A to press the brake pad 205A against the first rotor 206A. The resulting friction between the brake pad 205A and the first rotor 206A slows (e.g., stops, etc.) the rotation of the first wheel 102A. Additionally or alternatively, the other wheels 106B, 106C, 106D and corresponding ones of the brakes 202B, 202C, 202D can be similarly engaged by the brake controller 104 via the user interface 108.

The brake controller 104 can determine the wear associated with ones of the brake pads 205A, 205B, 205C, 205D. For example, the brake controller 104 can, via the wheel sensors 208A, determine the current output of the brake motor 207A associated with the first brake 202A to identify the delay or latency between the activation of the first brake 202A and a current maxima. In such examples, the identified current maxima of the output of the brake motor 207A corresponds to contact between the brake pad 205A and the rotor 206A. Particularly, when the brake pad 205A contacts the rotor 206A, comparatively greater pressure is required to hold the brake pad 205A against the rotor 206A (e.g., compared to moving the brake pad 205A towards the rotor 206A, etc.), which corresponds to a greater current demand by the brake motor 207A. In some examples, the brake controller 104 can correlate the latency to a wear level of the brake pad 205A because the greater the wear of the brake pad 205A, the longer between the application of the brake 202A and the contact between the brake pad 205A and the rotor 206A. Accordingly, in some examples, the brake controller 104 can, based on the latency between the application of the first brake 202A and the current maxima, determine the wear level of the first brake pad 205A. An example illustrating the correlation between current maxima and brake pad wear is described below in conjunction with FIGS. 4A and 4B.

Additionally or alternatively, the brake controller 104 can determine the wear level of the first brake pad 205A based on the power associated with the operation of the first brake 202A. For example, when the brake pad 205A has a low wear level (e.g., the brake pad 205A is new, etc.), the power required to press the brake pad 205A against the rotor 206A is comparatively higher than when the brake pad 205A has a high wear level. In such examples, as the brake pad 205A wears, the weight (e.g., thickness, size, etc.) of the brake pad 205A decreases, which reduces the power required to hold brake pad 205A against the rotor 206A. As such, the brake controller 104 can correlate (1) the power input to the brake 202A with the (2) weight (e.g., thickness, size, etc.) of the brake pad 205A and/or the wear level of the brake pad 205A. Additionally or alternatively, the brake controller 104 can determine the wear level of the first brake pad 205A based on the noise level, noise occurrence rate, and/or noise frequency associated with the brake 202A. For example, the brake controller 104 can, via the wheel sensors 208A, detect noises associated with contact between the backplate of the brake pad 205A and/or the caliper 204A with the rotor 206A, which is indicative of significant wear on the brake pad 205A. As used herein, the noises associated with contact between the backplate of the brake pad 205A and/or the caliper 204A with the rotor 206A is referred to as "brake squeal." In such examples, the brake controller 104 can determine the wear level based on the occurrence rate of brake noise and/or the loudness of the brake noise. The wear level of the brake pads 205B, 205C, 205D can be similarly determined by the brake controller 104 (e.g., via the duration from the activation of the brakes 202B, 202C, 202D and the current maxima, the power output by the brakes 202B, 202C, 202D, the noise associated with the brakes 202B, 202C, 202D, etc.).

FIG. 3 is a block diagram of the brake controller 104 of FIGS. 1 and 2. In the illustrated example of FIG. 3, the brake controller 104 includes example user interface circuitry 302, example sensor interface circuitry 304, example brake event detector circuitry 306, example latency determiner circuitry 307, example threshold generator circuitry 308, example threshold comparator circuitry 310, example brake pad wear estimator circuitry 312, the memory 314, example alert generator circuitry 316, example brake interface circuitry 318, and example network interface circuitry 320.

The user interface circuitry 302 receives inputs from the user interface 108 of FIG. 1. For example, the user interface circuitry 302 can receive an indication to operate the brakes during service of the vehicle 100 (e.g., instructions to cause the engagement of the calipers 204A, 204B, 204C, 204D to the rotors 206A, 206B, 206C, 206D, etc.). In some examples, the user interface circuitry 302 can receive a command and/or indication to initiate a brake wear check event. In some examples, the user interface circuitry 302 can receive an indication from the user interface 108 that one or more of the brake pads 205A, 205B, 205C, 205D has been replaced. In some examples, the user interface circuitry 302 can cause a message (e.g., a message, an alert, etc.) generated by the alert generator circuitry 316 and/or the brake pad wear estimator circuitry 312 to be presented to a user of the vehicle 100 via the user interface 108.

The sensor interface circuitry 304 receives sensor data from the sensors 208A, 208B, 208C, 208D, 110 of the example vehicle 100 and/or brake system 102. In some examples, the sensor interface circuitry 304 can transform the received sensor data from a machine-readable format (e.g., a voltage, a current, etc.) to a human-readable format (e.g., a string, a floating-point number, an integer, etc.).

The brake event detector circuitry 306 detects a braking event and/or a brake wear check event. For example, the brake event detector circuitry 306 can, via inputs to the user interface circuitry 302, detect a request (e.g., a user input, etc.) associated with a braking event (e.g., a depression of a brake pedal, etc.). Additionally or alternatively, the brake event detector circuitry 306 can, via information received via the sensor interface circuitry 304, trigger a braking event based on the condition of the vehicle 100 (e.g., the vehicle 100 is moving and an obstacle is detected in front of it, the vehicle 100 is moving and a stop sign is detected in front, etc.). In such examples, the brake event detector circuitry 306 can cause the brake interface circuitry 318 to operate the brakes 202A, 202B, 202C, 202D in a suitable manner in response to a detected and/or triggered braking event.

In some examples, the brake event detector circuitry 306 can detect and/or trigger a brake wear check event in response to a request (e.g., a user input, etc.), received via the user interface circuitry 302. Additionally or alternatively, the brake event detector circuitry 306 can trigger a brake wear check event in response to an event (e.g., upon engine ignition, after engine is shut off, after the vehicle 100 has been braked for a threshold period, etc.) or periodically (e.g., every day, once a week, etc.).

The latency determiner circuitry 307 determines the latency of the brakes 202A, 202B, 202C, 202D. For example, the latency determiner circuitry 307 can, based on the current profile of the brake motors 207A, 207B, 207C, 207D of the brakes 202A, 202B, 202C, 202D, determine the latency of each of the brakes 202A, 202B, 202C, 202D. For example, the latency determiner circuitry 307 can, based on a timing of a current maxima, determine the latency between the activation of the first brake 202A and contact between the first brake pad 205A and the rotor 206A. In such examples, the latency of the first brake 202A can be correlated with the wear level of the brake pad 205A. That is, a relative increase in the latency of the first brake 202A can be correlated with a reduction in thickness of the brake pad 205A caused by brake pad wear. The function of the latency determiner circuitry 307 is described in additional detail below in conjunction with FIG. 4.

The threshold generator circuitry 308 generates thresholds to compare brake parameters with to determine the wear level of the brake pads 205A, 205B, 205C, 205D. For example, the threshold generator circuitry 308 can determine wear thresholds for brake latency, brake motor current demand, brake power, brake noise level, and/or brake squeal frequency. In some examples, the threshold generator circuitry 308 can determine wear thresholds for the first brake pad 205A based on the brake parameters recorded in the memory 314 when the brake pad 205A was initially installed. In some examples, the threshold generator circuitry 308 can generate thresholds as a factor of the brake parameter as initially installed (e.g., 110% of the installed latency, 125% of the installed latency, 150% of the installed latency, etc.). Additionally or alternatively, the threshold generator circuitry 308 can determine wear thresholds for the first brake pad 205A based on brake pad wear information associated with a similar type of brake pad used on other vehicles (e.g. received from the central server 114 over the network 112, etc.). In such examples, the threshold generator circuitry 308 can determine appropriate threshold(s) based on brake parameters associated with the brake pads of other vehicles.

The threshold comparator circuitry 310 compares received brake parameter data received via the sensor interface circuitry 304 with the thresholds determined by the threshold generator circuitry 308. For example, the threshold comparator circuitry 310 can compare brake latency with brake latency threshold(s) generated by the threshold generator circuitry 308. In some examples, the threshold comparator circuitry 310 can compare the brake power with a brake power threshold generated by the threshold generator circuitry 308. In some examples, the threshold comparator circuitry 310 can compare the brake squeal noise level with a noise level threshold generated by the threshold generator circuitry 308.

The brake pad wear estimator circuitry 312 estimates the brake pad wear based on the comparison(s) of the threshold comparator circuitry 310. For example, the brake pad wear estimator circuitry 312 can make a binary determination (e.g., if a brake pad needs to be replaced, if the brake pad does not need to be replaced, etc.). In such examples, the brake pad wear estimator circuitry 312 can compare one or more of the brake parameters with a single corresponding threshold (e.g., brake latency with a latency parameter, brake power with a brake power parameter, brake noise with a brake noise parameter, etc.). In other examples, the brake pad wear estimator circuitry 312 can determine the remaining service life of the brake pads 205A, 205B, 205C, 205D based on comparing each of the brake parameters to multiple thresholds (e.g., a threshold associated with 50% remaining service life, a threshold associated with 25% remaining service life, etc.).

In some examples, the brake pad wear estimator circuitry 312 can estimate the remaining service life based on historical visual inspections of the vehicle 100 and/or vehicles similar to the vehicle 100. For example, the brake pad wear estimator circuitry 312 can, via parameters (e.g., stored in the memory 314, etc.) associated with visual inspection, estimate the remaining service life. In some such examples, the brake pad wear estimator circuitry 312 can estimate the brake pad wear estimator circuitry 312 directly based on an input by a technician (e.g., a technician estimates 50% of the service life remains during a visual inspection, etc.) and/or interpolation (e.g., a linear interpolation, a logistic interpolation, etc.) of an input of a technician and the current mileage of the vehicle 100. In some examples, the brake pad wear estimator circuitry 312 can make similar determinations based on vehicles similar to the vehicle 100 with similar brake usage (e.g., braking frequency, brake forcefulness, etc.)

In some examples, the brake pad wear estimator circuitry 312 can estimate the remaining service life of the brake pads 205A, 205B, 205C, 205D based on historic driving behaviors associated with the vehicle 100 (e.g., frequency of user braking, intensity of user braking, etc.). In such examples, the brake pad wear estimator circuitry 312 can increase the expected service life of brake pads 205A, 205B, 205C if the vehicle 100 is likely to be heavily braked or decrease the expected service life of brake pads 205A, 205B, 205C if the vehicle 100 is likely to be less lightly braked. In some examples, the brake pad wear estimator circuitry 312 can be implemented via a recurrent neural network (RNN) and/or a long short-term memory neural network (LSTM).

The memory 314 stores historic brake parameters associated with braking events and brake wear check events. In some examples, the memory 314 can store brake parameters generated by sensor interface circuitry 304 and associated with the brake 202A, 202B, 202C, 202D. For example, when a new brake pad is installed on the vehicle 100, the memory 314 can store brake parameters (e.g., latency, brake power, etc.) associated with the new brake pad. Similarly, when a brake pad is removed, the memory 314 can store a record of the actual wear of the brake pad (e.g., determined by visual inspection, etc.) and associated brake parameters (e.g., associated with the last brake pad wear check event, etc.). Additionally or alternatively, the memory 314 can store brake parameters associated with other vehicles, as retrieved from the central server 114. In some examples, the memory 314 can be implemented by a memory of the vehicle 100 (e.g., a memory associated with the electronic control unit (ECU) of the vehicle 100, etc.) and/or a memory associated with a device associated with a user of the vehicle 100 (e.g., a mobile device of the user, etc.). In some examples, the memory 314 can be implemented as a memory described below in conjunction with FIG. 7.

The alert generator circuitry 316 generates alerts for the user of the vehicle 100. For example, the alert generator circuitry 316 can generate a visual and/or audio alert for the user of the vehicle 100. For example, the alert generator circuitry 316 can alert the user one or more the brake pads 205A, 205B, 205C, 205D needs to be replaced. In other examples, the alert generator circuitry 316 can generate an alert regarding the remaining life of the brakes. In such examples, the alert generator circuitry 316 can, via the user interface circuitry 302, to present a visual and/or audio notification to a user of the vehicle 100.

The brake interface circuitry 318 interfaces with the brakes 202A, 202B, 202C, 202D to cause the activation of the calipers 204A, 204B, 204C, 204D. In some examples, the brake interface circuitry 318 can cause the activation and/or deactivation of the calipers 204A, 204B, 204C, 204D in response to instructions from the user interface circuitry 302. In some examples, the brake interface circuitry 318 can provide feedback information from the brakes 202A, 202B, 202C, 202D to the other components of the brake controller 104 of FIG. 3. In some examples, the brake interface circuitry 318 can cause the brakes 202A, 202B, 202C, 202D to undergo operations associated with a brake wear check event (e.g., engage the brake to determine the brake latency, etc.).

The network interface circuitry 320 interfaces the vehicle 100 with the network 112. For example, the network interface circuitry 320 can connect the vehicle 100 to the central server 114 to allow the vehicle 100 to send the central server historic data regarding the use of the brakes 202A, 202B, 202C, 202D. Additionally or alternatively, the network interface circuitry 320 can enable the brake controller 104 to access information from the central server 114 (e.g., historic brake pad wear information from other vehicles, etc.).

While an example manner of implementing the brake controller 104 of FIGS. 1 and 2 is illustrated in FIG. 3, one or more of the elements, processes, and/or devices illustrated in FIG. 3 may be combined, divided, re-arranged, omitted, eliminated, and/or implemented in any other way. Further the example user interface circuitry 302, the example sensor interface circuitry 304, the example brake event detector circuitry 306, the example latency determiner circuitry 307, the example threshold generator circuitry 308, the example threshold comparator circuitry 310, the example brake wear estimate circuitry 312, the example memory 314, the example alert generator circuitry 316, the example brake interface circuitry 318, the example network interface circuitry 320, and/or, more generally, the example brake controller 104 of FIGS. 2 and 3 may be implemented by hardware, software, firmware, and/or any combination of hardware, software, and/or firmware. Thus, for example, any of the example user interface circuitry 302, the example sensor interface circuitry 304, the example brake event detector circuitry 306, the example latency determiner circuitry 307, the example threshold generator circuitry 308, the example threshold comparator circuitry 310, the example brake wear estimate circuitry 312, the example memory 314, the example alert generator circuitry 316, the example brake interface circuitry 318, the example network interface circuitry 320, and/or, more generally, the example brake controller 104 of FIG. 3, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example user interface circuitry 302, the example sensor interface circuitry 304, the example brake event detector circuitry 306, the example latency determiner circuitry 307, the example threshold generator circuitry 308, the example threshold comparator circuitry 310, the example brake wear estimate circuitry 312, the example memory 314, the example alert generator circuitry 316, the example brake interface circuitry 318, the example network interface circuitry 320 is/are hereby expressly defined to include a non-transitory computer readable storage device or storage disk such as a memory, a digital versatile disk (DVD), a compact disk (CD), a Blu-ray disk, etc., including the software and/or firmware. Further still, the example brake controller 104 of FIGS. 1 and 2 may include one or more elements, processes, and/or devices in addition to, or instead of, those illustrated in FIG. 3, and/or may include more than one of any or all of the illustrated elements, processes and devices.

Figure 4B:
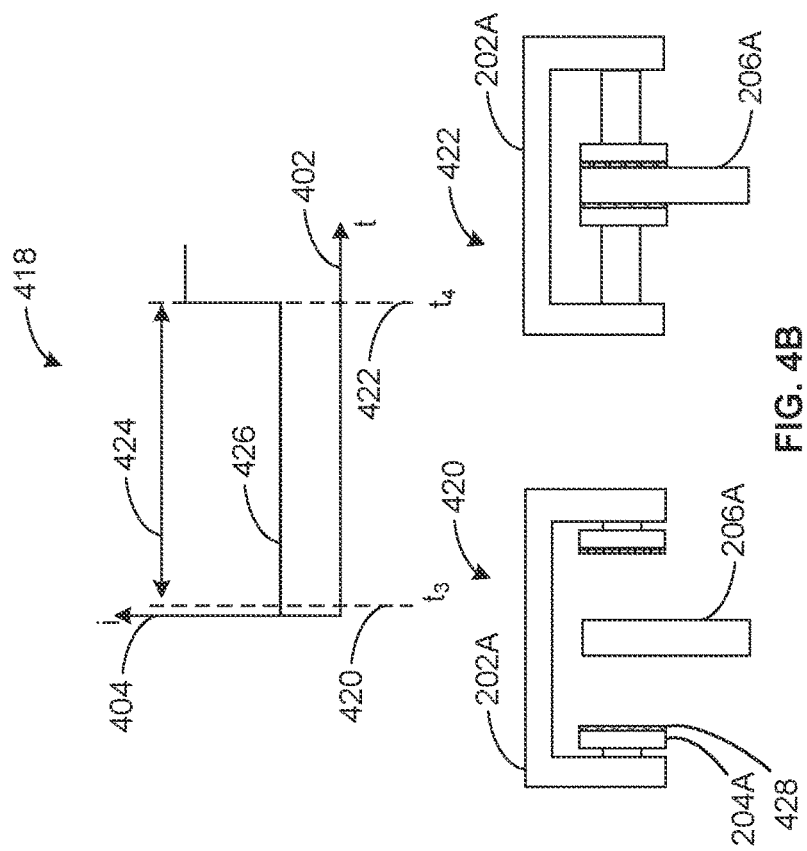
FIGS. 4A and 4B are simplified illustrations of the activation of the brakes of FIG. 2 and related time-current graphs.
Figure 4A:
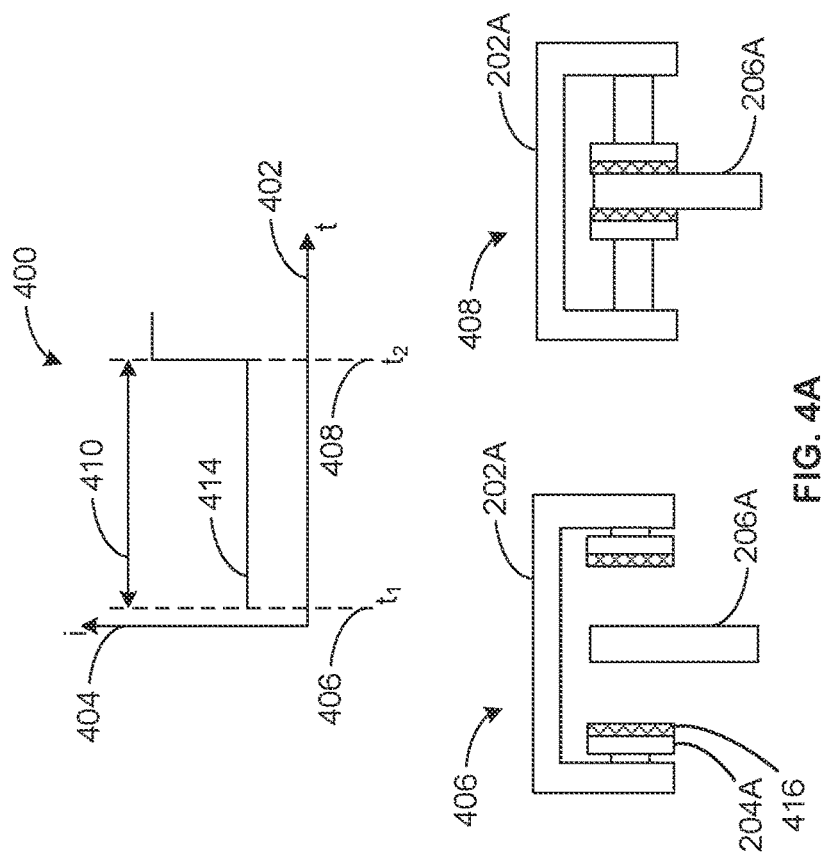

FIG. 4A is a simplified illustration of the activation of the brake 202A of FIG. 2 and associated current graph 400. In the illustrated example of FIG. 4A, the current graph 400 includes an example time axis 402 and an example current axis 404. The current graph 400 is described with reference to an example first time 406, an example second time 408, and an example delay or latency 410 extending therebetween. The current graph 400 includes an example current profile 414. In the illustrated example of FIG. 4A, the caliper 204A includes an example new brake pad 416 at the first time 406 and the second time 408. In the illustrated example of FIG. 4A, at the first time 406, the caliper 204A is not in contact with the rotor 206A. In the illustrated example of FIG. 4A, at the second time 408, the caliper 204A is in contact with the rotor 206A. The new brake pad 416 has the same functionality and features as the brake pad 205A unless stated otherwise.

In the illustrated example of FIG. 4A, the time axis 402 reflects the time that has elapsed between the activation of the brake 202A at the first time 406 and the second time 408. The first time 406 corresponds to the time the brake 202A receives a signal to engage the caliper 204A and the rotor 206A from the brake controller 104 of FIGS. 1-3 (e.g., the brake interface circuitry 318, etc.). The second time 408 corresponds to the time when the caliper 204A causes the brake pad 205A to come into contact with the rotor 206A. In the illustrated example of FIG. 4A, the latency 410 is the time between the command to engage the brake 202A and actual contact between the caliper 204A causes the brake pad 205A. The current axis 404 reflects the current demand of the motor associated with the brake 202A (e.g., the current required to drive the caliper 204A towards the rotor 206A, etc.).

The current profile 414 has two distinct current values, namely the current demand associated with driving the caliper 204A towards the rotor 206A (e.g., the current value between the first time 406 and the second time 408, etc.) and the current demand associated with holding the brake pad 205A in contact with the rotor 206A (e.g., the current value after the second time 408, the current maxima, etc.). Based on these distinctive current values, the brake controller 104 (e.g., the latency determiner circuitry 307 of FIG. 3, etc.) can determine the latency 410 by identifying the increase in current at the second time 408. The latency 410 corresponds to the amount of physical travel of the caliper 204A required to bring the new brake pad 416 into contact with the rotor 206A. In some examples, the current profile 414 can gradually change between the current value at first time 406 and the second time 408. In some such examples, the brake controller 104 can employ a current threshold (e.g., based on historical braking data, set by a manufacturer of the vehicle 100 and/or brake pad 416, etc.) to determine the latency 410.

FIG. 4B is a simplified illustration of the activation of the brake 202A of FIG. 2 and associated current graph 418. In the illustrated example of FIG. 4B, the current graph 418 includes the example time axis 402 of FIG. 4A and the example current axis 404 of FIG. 4A. The current graph 418 is described with reference to an example third time 420, an example fourth time 422, and an example latency 424 extending therebetween. The current graph 418 includes an example current profile 426. In the illustrated example of FIG. 4B, the caliper 204A includes an example worn brake pad 428 at the third time 420 and the fourth time 422. In the illustrated example of FIG. 4B, at the third time 420, the caliper 204A is not in contact with the rotor 206A. In the illustrated example of FIG. 4B, at the fourth time 422, the caliper 204A is in contact with the rotor 206A.

The worn brake pad 428 corresponds to the new brake pad 416 of FIG. 4A after a significant amount of wear (e.g., a significant reduction in the friction material, etc.). When compared to the new brake pad 416 of FIG. 4A, due to a reduction of friction material, the worn brake pad 428 is smaller in the direction of travel of the caliper 204A (e.g., lower thickness, etc.) and weighs less. In some examples, the reduction of friction material of the worn brake pad 428 has exposed portions of the caliper 204A and/or the backplate of the worn brake pad 428 to contact with the rotor 206A, which can cause brake fade and/or significant brake noise.

In the illustrated example of FIG. 4B, the time axis 402 reflects the time that has elapsed between the activation of the brake 202A at the third time 420 and the fourth time 422. The third time 420 corresponds to the time the brake 202A receives a signal to engage the caliper 204A and the rotor 206A from the brake controller 104 of FIGS. 1-3 (e.g., the brake interface circuitry 318, etc.). The fourth time 422 corresponds to the time when the caliper 204A causes the brake pad 428 to come into contact with the rotor 206A. In the illustrated example of FIG. 4B, the latency 424 is the time between the command to engage the brake 202A and actual contact between the caliper 204A and the worn brake pad 428. The current axis 404 reflects the current demand of the motor associated with the brake 202A (e.g., the current required to drive the caliper 204A towards the rotor 206A, etc.).

Like the current profile 414 of FIG. 4A, the current profile 426 has two distinct current values, namely the current demand associated with driving the caliper 204A towards the rotor 206A (e.g., the current value between the third time 420 and the fourth time 422, etc.) and the current demand associated with holding the worn brake pad 428 in contact with the rotor 206A (e.g., the current value after the fourth time 422, the current maxima, etc.). In some examples, the current profile 426 can gradually change between the current value at the third time 420 and the fourth time 422. In some such examples, the brake controller 104 can employ a current threshold (e.g., based on historical braking data, set by a manufacturer of the vehicle 100 and/or brake pad 416, etc.) to determine the latency 424. In the illustrated examples of FIGS. 4A and 4B, the current demand associated with second time 408 of FIG. 4A is the same as the current demand associated with the fourth time 422 because the current required to hold the new brake pad 416 in contact with the rotor 206A is the same as the current required to hold the worn brake pad 428 in contact with the rotor 206A. In other examples, the current demand associated with second time 408 is different than the current demand associated with the fourth time 422. In such examples, the difference in current demand between the second time 408 and the fourth time 422 can be due to the wear of the worn brake pad 428 (e.g., the wear causing less friction between the worn brake pad 428 and the rotor 206A, etc.). In some such examples, the brake controller 428 can identify this change in current demand to determine the amount of wear of the worn brake pad 428.

The current profiles 414, 426 are generally represented as straight lines with an instantaneous increase in current at the first time 408 and the 422, respectively. In some examples, the current profiles 414, 426 may include noise associated with road conditions, irregularities in the brakes 202A, and/or sensor error. In some such examples, the braking controller 104 can smooth the current profile 414, 426 via filters. Additionally or alternatively, the braking controller 104 can process the current profiles 414, 426 via a windowing function.

Based on these distinctive current values, the brake controller 104 (e.g., the latency determiner circuitry 307 of FIG. 3, etc.) can determine the latency 424 by identifying the increase in current at the fourth time 422. The latency 424 corresponds to the amount of physical travel of the caliper 204A required to bring the worn brake pad 428 into contact with the rotor 206A. Because the physical geometry of the brake 202A is fixed (e.g., the size and shape of the caliper 204A and rotor 206A do not significantly change over the service life of the vehicle 100, etc.), the difference between the latency 410 of FIG. 4A and the latency 424 of FIG. 4B corresponds to the reduction of thickness between the new brake pad 416 and the worn brake pad 428. That is, the greater the difference between the latency 410 and the latency 424, the greater the wear of the worn brake pad 428. Accordingly, the brake controller 104 can estimate the wear of the worn brake pad 428 based on the difference based on the latency 424. Accordingly, the threshold generator circuitry 308 can generate a latency threshold based on the latency 410.

Figure 5:
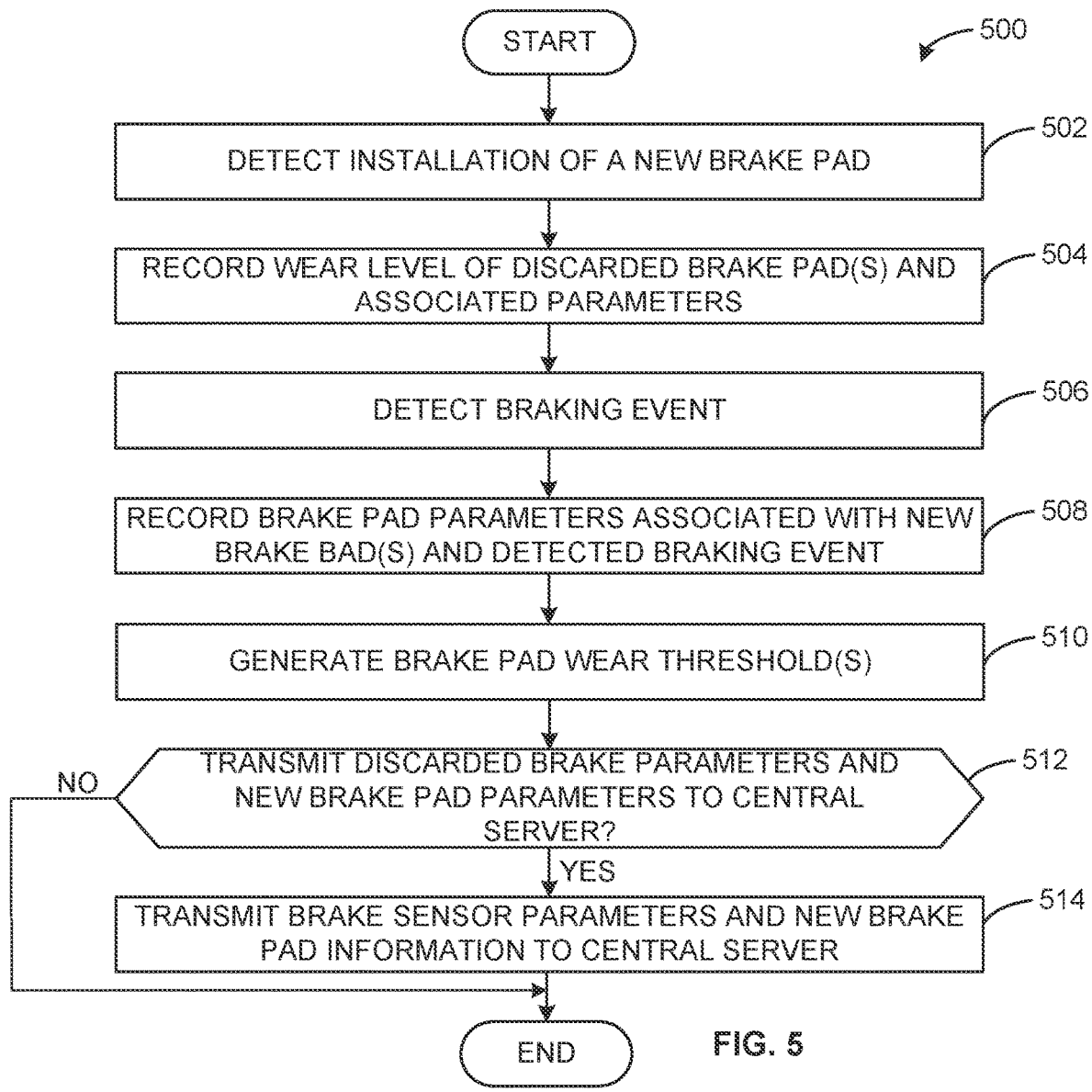
FIGS. 5 and 6 are flowcharts representative of example machine readable instructions that may be executed by example processor circuitry to implement the brake controller of FIGS. 1 and 2.
Figure 6:
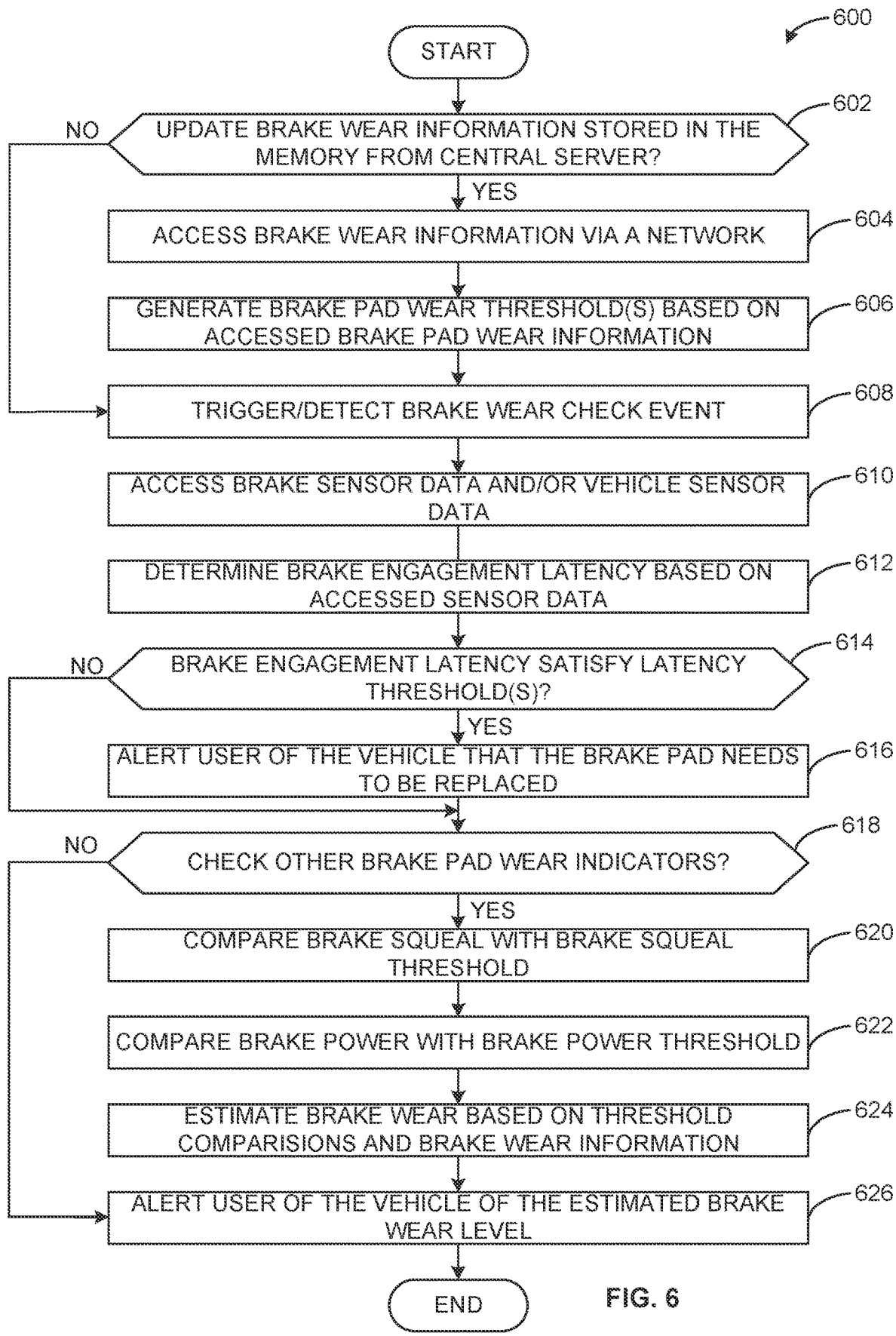

Flowcharts representative of example hardware logic circuitry, machine readable instructions, hardware implemented state machines, and/or any combination thereof for implementing the brake controller 104 of FIGS. 2 and 3 are shown in FIGS. 5 and 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example programs are described with reference to the flowchart illustrated in FIGS. 5 and 6, many other methods of implementing the example brake controller 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations 500, 600 of FIGS. 5 and 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to implement the brake controller 104 during the installation of a new brake pad 416. The machine readable instructions and/or operations 500 of FIG. 5 begin at block 502, the user interface circuitry 302 and/or the sensor interface circuitry 304 detects the installation of a new brake pad 416. For example, the user interface circuitry 302 can determine the new brake pad 416 has been coupled to the first caliper 204A in response to an input, via the user interface 108, input by a user of the vehicle 100 and/or a technician servicing the vehicle 100. In other examples, the sensor interface circuitry 304 can detect that the new brake pad 416 (e.g., detecting that a brake pad has been uncoupled from the caliper 204A, etc.). In some such examples, the user interface circuitry 302 can verify the new brake pad 416 has been installed via the user interface 108. In other examples, the user interface circuitry 302 and/or the sensor interface circuitry 304 can detect the new brake pad 416 has been installed by any other suitable means.

At block 504, the memory 314 records the wear associated with the discarded brake pad(s). For example, a user of the vehicle 100 and/or a technician servicing the vehicle 100 can, via the user interface 108, input the wear level (e.g., via a weight reduction, via the reduced length of brake pad, etc.) associated with the discarded brake pad. In such examples, the user interface circuitry 302 can write the recorded wear level and associated vehicle parameters (e.g., vehicle mileage associated with the recorded wear, latency associated with the last brake event on the discarded brake pad, power associated with the last brake event on the discarded brake pad, noise level associated with the last brake event on the discarded brake pad, etc.) to the memory 314.

At block 506, the brake event detector circuitry 306 detects a braking event. For example, the brake event detector circuitry 306 can detect the first braking event after the installation of the new brake pad 416. In some examples, the brake event detector circuitry 306 can detect contact of the new brake pad 416 against the rotor 206A. In some examples, the brake event detector circuitry 306 can detect the braking event via sensor data received via the sensor interface circuitry 304 and/or feedback received via the brake interface circuitry 318. In other examples, the brake event detector circuitry 306 can detect any suitable braking event (e.g., a second braking event after the installation of the new brake pad 416, a tenth braking event after the installation of the new brake pad 416, etc.) via any other suitable means.

At block 508, the memory 314 records the brake pad parameters associated with the new brake pad 416 and the detected braking event. For example, the brake event detector circuitry 306 can write the new brake pad parameters (e.g., a latency associated with the last brake event on the detected brake pad, power associated with the detected brake event, noise level associated with the detected brake pad event, etc.) to the memory 314. In some examples, the brake event detector circuitry 306 can record average (e.g., mean, median, mode, etc.) of brake pad parameters associated with a set of braking events (e.g., a first ten braking events after the installation of the new brake pad 416, a first hundred braking events after the installation of the new brake pad 416, etc.).

At block 510, the threshold generator circuitry 308 generates wear level thresholds based on the recorded brake pad parameters associated with the new brake pad 416 and/or the discarded brake pad. For example, the parameters associated with the new brake pad 416 can be benchmarked and used to generate thresholds for the new brake pad 416. For example, the latency associated with the new brake pad 416 can be recorded and thresholds can be generated as a portion of the latency (e.g., a replacement threshold can be 25% of the latency, etc.). In some examples, the threshold generator circuitry 308 can similarly generate thresholds for other wear characteristics (e.g., brake power usage, brake noise, etc.).

At block 512, the network interface circuitry 320 determines if the discarded brake pad parameters and the new brake pad parameters are to be transmitted to the central server 114. For example, the network interface circuitry 320 can determine if to transmit the brake pad parameters to the central server 114 based on an instruction for a user of the vehicle 100, a technician servicing the vehicle 100, and/or the central server 114. In other examples, the network interface circuitry 320 can determine if to transmit the brake pad parameters to the central server 114 by any other suitable means. If the network interface circuitry 320 determines discarded brake pad parameters and the new brake pad parameters are to be transmitted to the central server 114, the operations 500 advances to block 514. If the network interface circuitry 320 determines the discarded brake pad parameters and the new brake pad parameters are not to be transmitted to the central server 114, the operations 500 ends. At block 514, the network interface circuitry 320 transmits the brake parameters to the central server 114 via the network 112. In other examples, the network interface circuitry 320 can transmit the brake parameters to the central server 114 via any other suitable means.

FIG. 6 is a flowchart representative of example machine readable instructions and/or example operations 600 that may be executed and/or instantiated by processor circuitry to implement the brake controller 104 to determine the wear level of one or more brake pads. While the operations 600 of FIG. 6 are described with reference to the first brake pad 205A, the operations 600 can be used in conjunction with multiple brake pads on a vehicle 100 simultaneously and/or consecutively (e.g., the brake pads 205B, 205C, 205D, etc.).

The machine readable instructions and/or operations 600 of FIG. 6 begin at block 602, at which the network interface circuitry 320 determines if the brake wear information stored in the memory 314 is to be updated from the central server 114. For example, the network interface circuitry 320 can receive updates from the central server 114 periodically (e.g., every day, every month, etc.). Additionally or alternatively, the network interface circuitry 320 can update the central server 114 in response to an event (e.g., vehicle 100 ignition, having access to the network 112, etc.). If the network interface circuitry 320 determines the brake wear information is to be updated from the central server 114, the operations 600 advances to block 604. If the network interface circuitry 320 determines the brake wear information is not to be updated from the central server 114, the operations 600 advances to block 608.

At block 604, the network interface circuitry 320 accesses the brake wear information stored in the memory 314 via the network 112. For example, the network interface circuitry 320 can connect the vehicle 100 to the central server 114 to allow the central server 114 to update the memory 314 with brake pad wear parameters associated with other vehicles similar to the vehicle 100. In other examples, the central server 114 can push the information of the network interface circuitry 320 on a periodic basis.

At block 606, threshold generator circuitry 308 generates wear level threshold(s) based on the brake pad wear information stored in the memory 314. For example, the parameters stored in the memory 314 can be used to generate thresholds for the new brake pad 416. For example, the latency associated with the new brake pad(s) can be recorded and thresholds can be generated as a portion of the latency (e.g., a replacement threshold can be 25% of the latency, etc.). In some examples, the threshold generator circuitry 308 can similarly generate thresholds for other wear characteristics (e.g., brake power usage, brake noise, etc.).

At block 608, the brake event detector circuitry 306 triggers and/or detects a brake wear check event. For example, the brake event detector circuitry 306 can detect a brake wear check event in response to a request (e.g., a user input, etc.), received via the user interface circuitry 302. Additionally or alternatively, the brake event detector circuitry 306 can trigger a brake wear check event in response to an event (e.g., upon engine ignition, after engine is shut off, after the vehicle 100 has been braked for a threshold period, etc.) or periodically (e.g., every day, once a week, etc.). In other examples, the brake event detector circuitry 306 can trigger a brake wear check event by any other suitable means.

At block 610, the sensor interface circuitry 304 accesses brake sensor data and/or vehicle sensor data. For example, the sensor interface circuitry 304 can retrieve data from the sensors 208A, 208B, 208C, 208D, 110 and/or other sensors associated with the vehicle 100. In some examples, the sensor interface circuitry 304 can transform the received data from a machine-readable format (e.g., a voltage value, a current value, etc.) into a human-readable format (e.g., a string, a floating-point number, an integer, etc.).

At block 612, the latency determiner circuitry 307 determines the brake engagement latency based on accessed sensor data. For example, the latency determiner circuitry 307 can, based on the current profile of the electric motor of the brakes 202A, 202B, 202C, 202D received by the sensor interface circuitry 304, determine the latency of each of the brakes 202A, 202B, 202C, 202D. For example, the latency determiner circuitry 307 can based on a location of a current maxima determine the time between the activation of the first brake 202A and contact between the first brake pad 205A and the rotor 206A. In such examples, the latency of the first brake 202A can be correlated with the wear level of the brake pad 205A. That is, a relative increase in the latency of the first brake 202A can be correlated with a reduction in the size of the brake pad 205A caused by brake pad wear.

At block 614, the threshold comparator circuitry 310 determines if the brake engagement latency satisfies engagement time threshold(s). For example, the threshold comparator circuitry 310 can compare the determined latency with the latency threshold determined by the threshold generator circuitry 308 during the execution of block 606. If the threshold comparator circuitry 310 determines the brake engagement latency satisfies the latency threshold, the operations 600 advances to block 616. If the threshold comparator circuitry 310 determines the brake engagement latency does not satisfy the latency threshold, the operations 600 advances to block 618.

At block 616, the alert generator circuitry 316 alerts the user of the vehicle 100 that the brake pad 205A needs to be replaced. For example, the alert generator circuitry 316 can generate a visual and/or audio alert for the user of the vehicle 100. For example, the alert generator circuitry 316 can alert the user one or more of the brake pads 205A, 205B, 205C, 205D needs to be replaced. In other examples, the alert generator circuitry 316 can alert any other suitable manner.

At block 618, the threshold comparator circuitry 310 determines if other brake pad wear indicators are to be checked. If the other brake pad wear indicators are to be checked, the operations 600 advances to block 620. If the other brake wear indicators are not to be checked, the operations 600 are to advances to block 626. At block 620, the threshold comparator circuitry 310 compares the brake squeal with the brake squeal threshold. For example, the threshold comparator circuitry 310 can compare a brake squeal, received from microphones via the sensor interface circuitry 304, with a brake squeal threshold determined by the threshold generator circuitry 308 during the execution of block 606. In some examples, the brake squeal threshold and the determined brake squeal can be a noise level and/or loudness (e.g., a decibel value, etc.). In other examples, the brake squeal threshold and the determined brake squeal can be a sequel frequency (e.g., a quantity of brake squeals over a period of time, etc.). In other examples, the brake squeal threshold and the determined brake squeal can be a pitch (e.g., a pitch of the noise, etc.) recorded by the wheel sensors 208A, 208B, 208C, 208D.

At block 622, the threshold comparator circuitry 310 compares the brake power with the brake power threshold. For example, the threshold comparator circuitry 310 can compare a brake power, received via the sensor interface circuitry 304, with a brake power threshold determined by the threshold generator circuitry 308 during the execution of block 606.

At block 624, the brake wear estimator circuitry 312 estimates brake wear based on the threshold comparisons and brake wear information. For example, the brake wear estimator circuitry 312 can make a binary determination (e.g., if a brake pad needs to be replaced, if the brake pad does not need to be replaced, etc.). In other examples, the brake pad wear estimator circuitry 312 can determine the remaining service life of the brake pads 205A, 205B, 205C, 205D based on comparing each of the brake parameters to multiple thresholds (e.g., a threshold associated with 50% remaining service life, a threshold associated with 25% remaining service life, etc.).

At block 626, the alert generator circuitry 316 alerts a user of the vehicle 100 of the estimated brake wear level. For example, the alert generator circuitry 316 can generate a visual and/or audio alert for the user of the vehicle 100 regarding the determined wear level of the brake pads 205A, 205B, 205C, 205D. For example, the alert generator circuitry 316 can alert the user one or more the brake pads 205A, 205B, 205C, 205D needs to be replaced. In other examples, the alert generator circuitry 316 can alert any other suitable manner.

Figure 7:
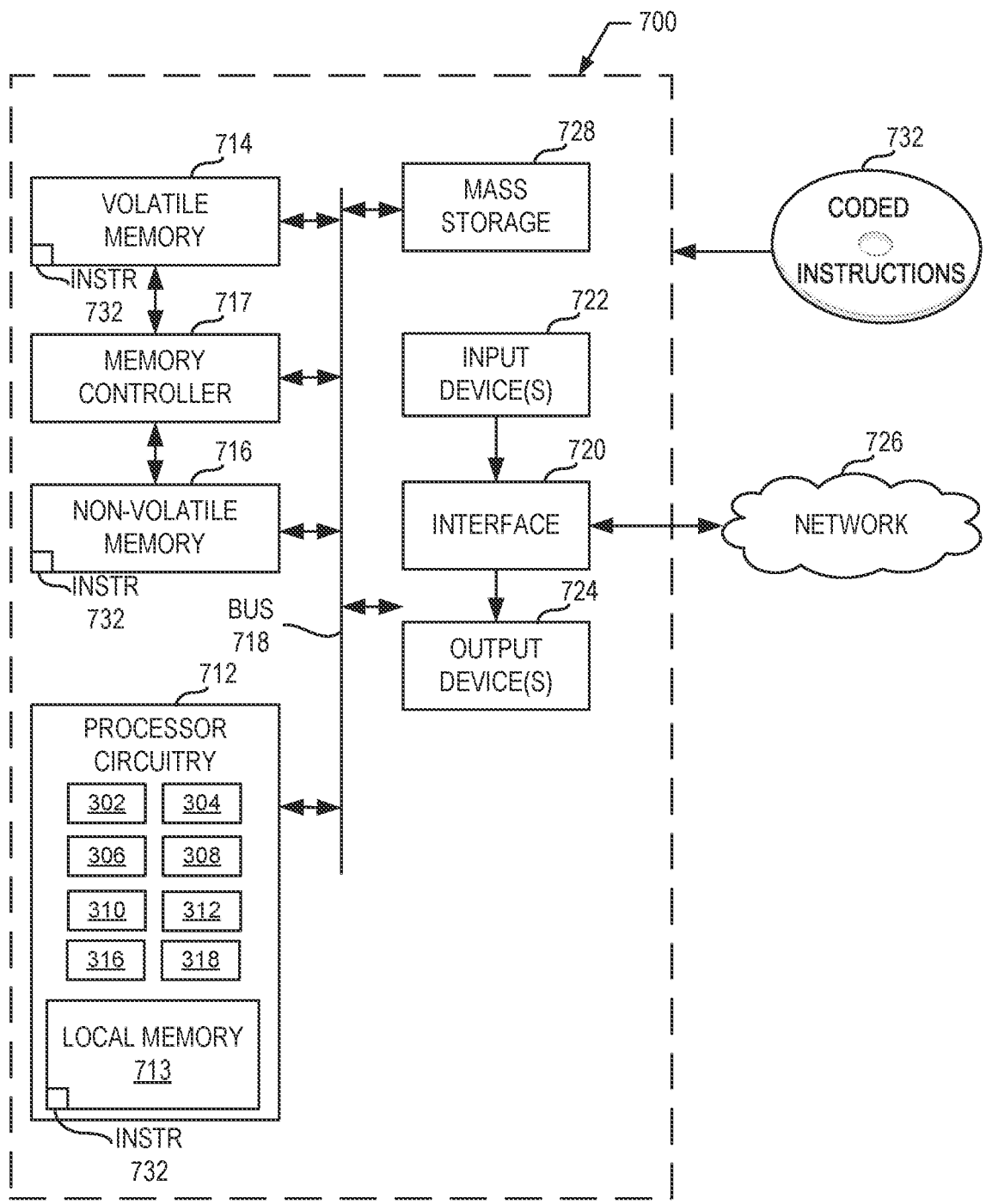
FIG. 7 is a block diagram of an example processing platform including processor circuitry structured to execute the example machine readable instructions of FIGS. 5-6 to implement the brake controller of FIGS. 1 and 2.

FIG. 7 is a block diagram of an example processor platform 700 structured to execute and/or instantiate the machine readable instructions and/or operations of FIGS. 5 and 6 to implement the brake controller 104 of FIGS. 2 and 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the user interface circuitry 302, the sensor interface circuitry 304, the brake event detector circuitry 306, the latency determiner circuitry 307, the threshold generator circuitry 308, the threshold comparator circuitry 310, the brake wear estimate circuitry 312, the alert generator circuitry 316, the brake interface circuitry 318, and the network interface circuitry 320.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS.

5 and 6, may be stored in the mass storage device 728, in the volatile memory 714, in the non-volatile memory 716, and/or on a removable non-transitory computer readable storage medium such as a CD or DVD.

Figure 8:
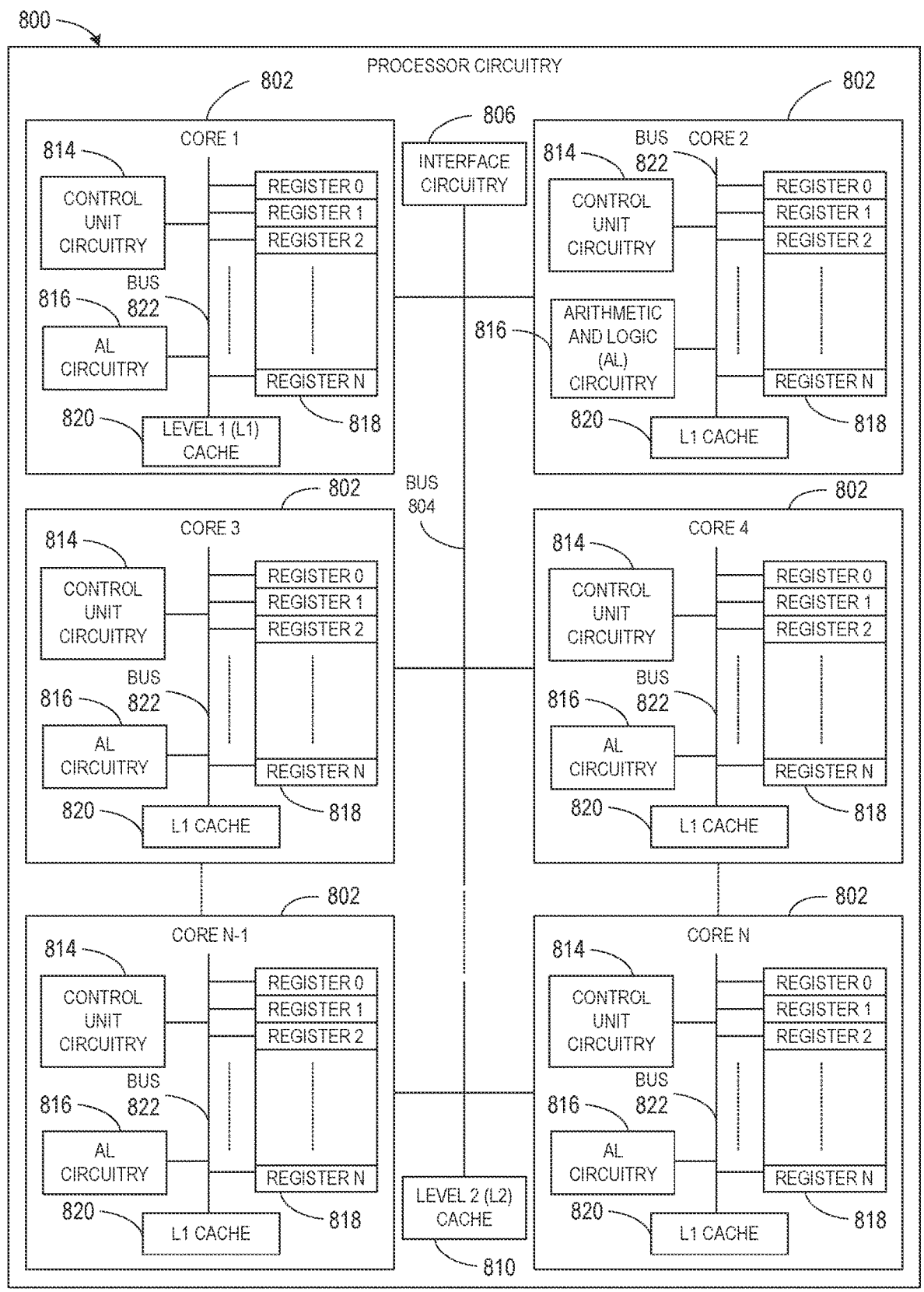
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 5 and 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
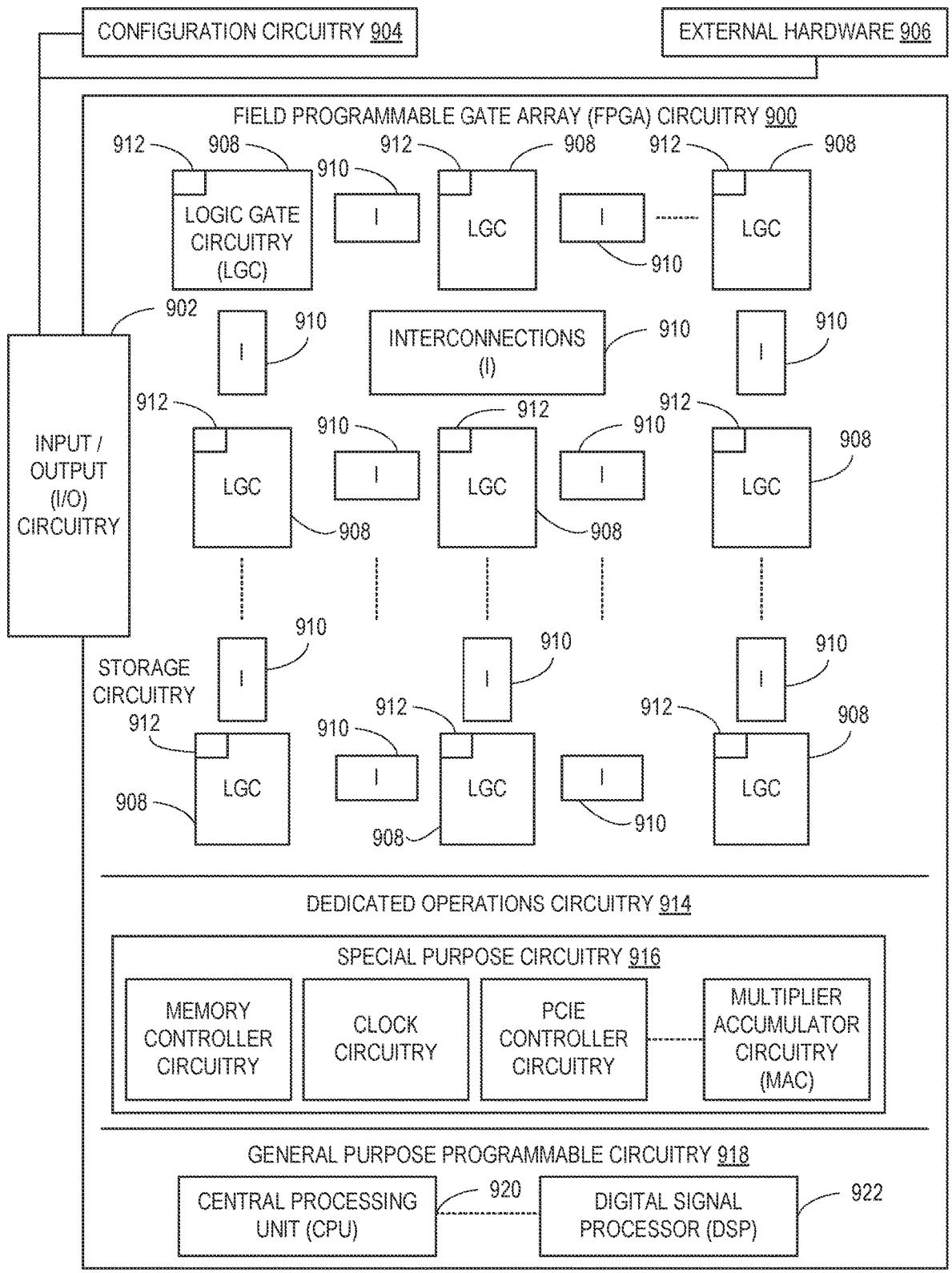
FIG. 9 is a block diagram of another example implementation of the processor circuitry of FIG. 8.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 00 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 5 and 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 5 and 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some, or all of the software represented by the flowcharts of FIGS. 5 and 6. As such, the FPGA circuitry 900 may be structured to effectively instantiate some or all of the machine readable instructions of the flowchart of FIGS. 5 and 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 5 and 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIGS. 5 and 6 and/or other desired operations. The logic gate circuitry 908 shown in FIG. 6 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 6 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 8 may additionally be implemented by combining the example microprocessor 800 of FIG. 8 and the example FPGA circuitry 900 of FIG. 9. In some such hybrid examples, a first portion of the machine readable instructions represented by the flowchart of FIGS. 5-6 may be executed by one or more of the cores 802 of FIG. 8 and a second portion of the machine readable instructions represented by the flowcharts of FIGS. 5 and 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example methods, apparatus, systems, and articles of manufacture to methods and apparatus to determine brake pad wear are disclosed herein. Further examples and combinations thereof include the following:

Example 1 includes a vehicle comprising a brake including a rotor, and a brake pad, and a brake controller to detect a request to determine a wear level of the brake pad, activate the brake to cause contact between the brake pad and the rotor, and determine, based on a latency between the activation of the brake and the contact between the brake pad and the rotor, the wear level.

Example 2 includes the vehicle of example 1, wherein the brake controller further determines the wear level by comparing a brake motor power output to a second threshold, the second threshold corresponding to a reduction in the brake pad associated with a high wear level.

Example 3 includes the vehicle of example 1, further including a caliper coupled to the brake pad, and a microphone measuring brake noise, and wherein the brake controller further determines the wear level based on the brake noise.

Example 4 includes the vehicle of example 1, further including a brake motor, the brake motor causing the brake pad to contact the rotor in response to a user input.

Example 5 includes the vehicle of example 4, further including a sensor to measure a current of the brake motor, and wherein the brake controller further determines the latency based on a duration from the activation of the brake and a current maxima detected by the brake motor current sensor, the current maxima associated with the contact between the brake pad and the rotor.

Example 6 includes the vehicle of example 1, wherein the vehicle is a first vehicle, and the brake controller is further to determine the first threshold based on a brake pad replacement record associated with a second vehicle.

Example 7 includes the vehicle of example 1, wherein the brake controller is further to compare the wear level to a fourth threshold and a fifth threshold, and estimate a remaining brake pad service life based on the comparison of the wear level to the fourth threshold and the fifth threshold.

Example 8 includes a method comprising detecting a request to determine a wear level of a brake pad of a brake of a vehicle, activating the brake to cause contact between the brake pad and a rotor of the brake, and determining, based on a latency between the activation of the brake and the contact between the brake pad and the rotor, the wear level.

Example 9 includes the method of example 8, wherein determining of the wear level includes comparing a brake motor power output to a second threshold, the second threshold corresponding to a reduction in the brake pad associated with a high wear level.

Example 10 includes the method of example 8, wherein the determining the wear level is based on brake noise.

Example 11 includes the method of example 8, wherein the brake is an electric brake including a brake motor.

Example 12 includes the method of example 11, further including determining the latency based on a duration from the activation of the brake and a current maxima detected by a sensor, the current maxima associated with the contact.

Example 13 includes the method of example 8, wherein the vehicle is a first vehicle, and further including determining the first threshold based on a brake pad replacement record associated with a second vehicle.

Example 14 includes the method of example 8, further including comparing the wear level to a fourth threshold and a fifth threshold, and estimating a remaining brake pad service life based on the comparison of the wear level to the fourth threshold and the fifth threshold.

Example 15 includes a non-transitory computer readable medium comprising instructions which, when executed, cause a processor to at least detect a request to determine a wear level of a brake pad of a brake of a vehicle, activate the brake to cause contact between the brake pad and a rotor of the brake, and determine, based on a latency between the activation of the brake and the contact between the brake pad and the rotor, the wear level.

Example 16 includes the non-transitory computer readable medium of example 15, wherein the instructions, cause the processor to further determine the wear level by comparing a brake motor power output to a second threshold, the second threshold corresponding to a reduction in the brake pad associated with a high wear level.

Example 17 includes the non-transitory computer readable medium of example 15, wherein the instructions, cause the processor to further determine the wear level based on brake noise.

Example 18 includes the non-transitory computer readable medium of example 15, wherein the instructions, cause the processor to determine the latency based on a duration from the activation of the brake and a current maxima detected by a sensor of a motor of the brake, the current maxima associated with the contact.

Example 19 includes the non-transitory computer readable medium of example 15, wherein the vehicle is a first vehicle, and the instructions, cause the processor to determine the first threshold based on a brake pad replacement record associated with a second vehicle.

Example 20 includes the non-transitory computer readable medium of example 15, wherein the instructions, cause the processor to compare the wear level to a fourth threshold and a fifth threshold, and estimate a remaining brake pad service life based on the comparison of the wear level to the fourth threshold and the fifth threshold.

The following claims are hereby incorporated into this Detailed Description by this reference, with each claim standing on its own as a separate embodiment of the present disclosure.

What is claimed is:
1. A vehicle comprising:
   a brake including:
      a rotor; and
      a brake pad; and
   a brake controller to:
      detect a request to determine a wear level of the brake pad;
      activate the brake to cause contact between the brake pad and the rotor;
      compare a brake motor power output to a second threshold, the second threshold corresponding to a reduction in the brake pad associated with a high wear level; and
      determine the wear level based on (1) a latency between the activation of the brake and the contact between the brake pad and the rotor and (2) the comparison of the brake motor power output to the second threshold.

2. The vehicle of claim 1, wherein the brake controller is further to:
   compare the wear level to a third threshold and a fourth threshold; and
   estimate a remaining brake pad service life based on the comparison of the wear level to the third threshold and the fourth threshold.

3. The vehicle of claim 1, further including:
   a caliper coupled to the brake pad; and
   a microphone measuring brake noise; and
   wherein the brake controller further determines the wear level based on the brake noise.

4. The vehicle of claim 1, further including a brake motor, the brake motor causing the brake pad to contact the rotor in response to a user input.

5. The vehicle of claim 4, further including a sensor to measure a current of the brake motor, and wherein the brake controller further determines the latency based on a duration from the activation of the brake and a current maxima detected by the brake motor current sensor, the current maxima associated with the contact between the brake pad and the rotor.

6. A first vehicle comprising:
a brake including:
a rotor; and
a brake pad; and
a brake controller to:
detect a request to determine a wear level of the brake pad;
activate the brake to cause contact between the brake pad and the rotor;
determine, based on a latency between the activation of the brake and the contact between the brake pad and the rotor, the wear level;
determine a first threshold based on a brake pad replacement record associated with a second vehicle; and
after a determination that the wear level does not satisfy the first threshold, generate an alert to replace the brake pad.

7. A method comprising:
detecting a request to determine a wear level of a brake pad of a brake of a vehicle;
activating the brake to cause contact between the brake pad and a rotor of the brake;
determining, based on a latency between the activation of the brake and the contact between the brake pad and the rotor, the wear level;
determining a first threshold based on a brake pad replacement record associated with a second vehicle; and
after determining the wear level does not satisfy the first threshold, generating an alert to replace the brake pad.

8. The method of claim 7, wherein the determining the wear level is based on brake noise.

9. The method of claim 7, wherein the brake is an electric brake including a brake motor.

10. The method of claim 9, further including determining the latency based on a duration from the activation of the brake and a current maxima detected by a sensor, the current maxima associated with the contact.

11. The method of claim 7, further including:
comparing the wear level to a third threshold and a fourth threshold; and
estimating a remaining brake pad service life based on the comparison of the wear level to the third threshold and the fourth threshold.

12. A method comprising:
detecting a request to determine a wear level of a brake pad of a brake of a vehicle;
activating the brake to cause contact between the brake pad and a rotor of the brake;
comparing a brake motor power output to a second threshold, the second threshold corresponding to a reduction in the brake pad associated with a high wear level; and
determining the wear level based on (1) a latency between the activation of the brake and the contact between the brake pad and the rotor and (2) the comparison of the brake motor power output to the second threshold.

13. A non-transitory computer readable medium comprising instructions which, when executed, cause a processor to at least:
detect a request to determine a wear level of a brake pad of a brake of a vehicle;
activate the brake to cause contact between the brake pad and a rotor of the brake;
compare a brake motor power output to a second threshold, the second threshold corresponding to a reduction in the brake pad associated with a high wear level; and
determine the wear level based on (1) a latency between the activation of the brake and the contact between the brake pad and the rotor, the wear level and (2) the comparison of the brake motor power output to the second threshold.

14. The non-transitory computer readable medium of claim 13, wherein the instructions, cause the processor to further determine the wear level based on brake noise.

15. The non-transitory computer readable medium of claim 13, wherein the instructions, cause the processor to determine the latency based on a duration from the activation of the brake and a current maxima detected by a sensor of a motor of the brake, the current maxima associated with the contact.

16. The non-transitory computer readable medium of claim 13, wherein the instructions, cause the processor to:
compare the wear level to a third threshold and a fourth threshold; and
estimate a remaining brake pad service life based on the comparison of the wear level to the third threshold and the fourth threshold.

17. A non-transitory computer readable medium instructions, which when executed cause a processor to:
detect a request to determine a wear level of a brake pad of a brake of a first vehicle;
activate the brake to cause contact between the brake pad and a rotor of the brake;
determine, based on a latency between the activation of the brake and the contact between the brake pad and the rotor, the wear level;
determine a first threshold based on a brake pad replacement record associated with a second vehicle; and
after a determination that the wear level does not satisfy the first threshold, generate an alert to replace the brake pad.

* * * * *